No. 702,155. Patented June 10, 1902.
H. ROWNTREE.
ELECTRIC MOTOR.
(Application filed Nov. 23, 1899.)
(No Model.) 2 Sheets—Sheet 1.
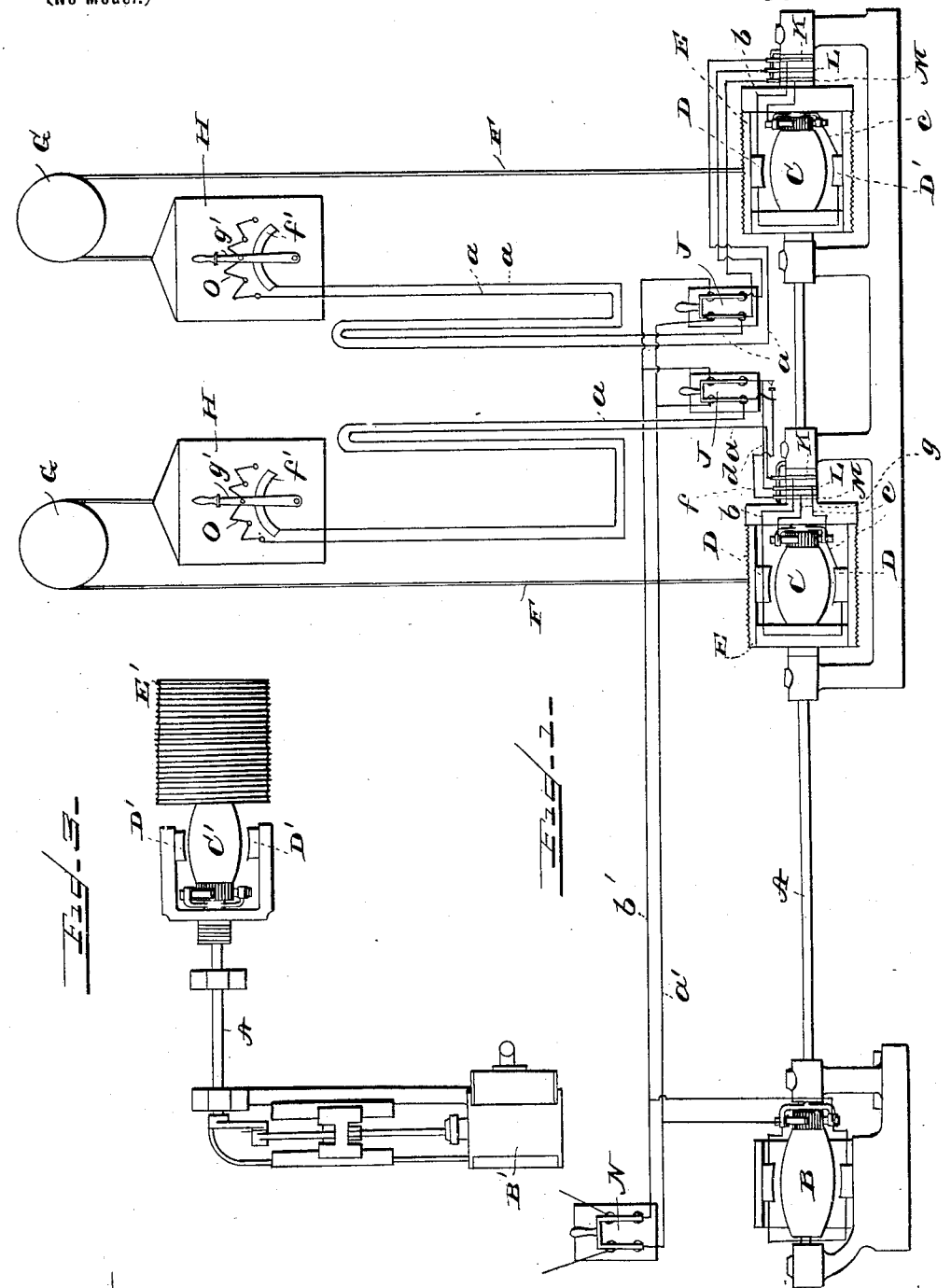

No. 702,155. Patented June 10, 1902.
H. ROWNTREE.
ELECTRIC MOTOR.
(Application filed Nov. 23, 1899.)
(No Model.) 2 Sheets—Sheet 2.
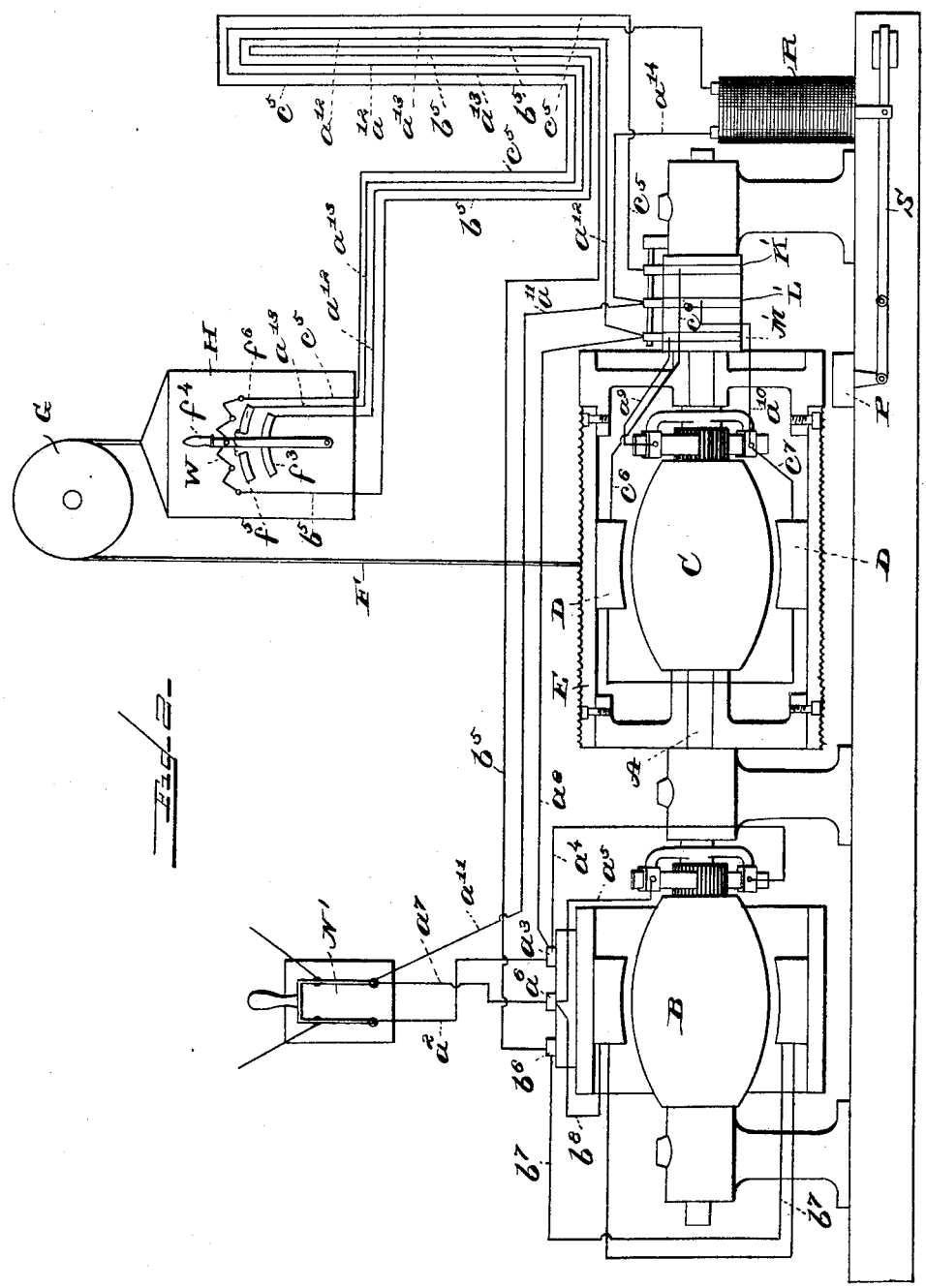
Witnesses
JB Weir
Ira D. Perry
Inventor
Harold Rowntree
By Mowden & Darby
Att'ys.

UNITED STATES PATENT OFFICE.

HAROLD ROWNTREE, OF CHICAGO, ILLINOIS, ASSIGNOR TO OTIS ELEVATOR COMPANY, OF NEW YORK, N. Y., A CORPORATION OF NEW JERSEY.

ELECTRIC MOTOR.

SPECIFICATION forming part of Letters Patent No. 702,155, dated June 10, 1902.

Application filed November 23, 1899. Serial No. 737,980. (No model.)

*To all whom it may concern:*

Be it known that I, HAROLD ROWNTREE, a citizen of the United States, residing at Chicago, in the county of Cook and State of Illinois, have invented a new and useful Improvement in Electric Motors, of which the following is a specification.

This invention relates to electric motors.

The object of the invention is to provide an electric motor particularly adapted for use as a hoisting-motor for elevators, but capable of general use where variations in speed and direction of operation are desired.

A further object of the invention is to provide an electric motor wherein a direct current is employed, thus avoiding the use of switching devices, and complicated wiring or controlling devices are not required.

A further object of the invention is to provide a motor wherein the armature and field are independently revoluble and the desired variation in speed and direction of operation is secured by varying the strength of current supplied to the armature or field.

A further object of the invention is to provide a motor having the armature and field independently revoluble and one of these parts being rotated by an auxiliary motor.

A further object of the invention is to provide a hoisting-motor for elevators or other purposes which is exceedingly simple in construction and manner of control.

Other objects of the invention will appear more fully hereinafter.

The invention consists, substantially, in the construction, combination, location, and relative arrangement, all as will be more fully hereinafter set forth, as shown in the accompanying drawings, and finally pointed out in the appended claims.

Referring to the accompanying drawings and to the various views and reference-signs appearing thereon, Figure 1 is a view, partly in side elevation and partly in diagram, illustrating a construction and arrangement embodying the principles of my invention. Fig. 2 is a similar view illustrating certain modifications embraced within the spirit and scope of my invention. Fig. 3 is a similar view illustrating certain other modifications embraced within the spirit and scope of my invention.

The same part is designated by the same reference-sign wherever it occurs throughout the several views.

In carrying my invention into practical operation I employ a motor having its armature and field independently revoluble, one of such parts being rotated or driven by an auxiliary motor. By such a construction and arrangement I am enabled to control the movements of the motor or the application of the same as to speed or direction by merely varying the strength of the current supplied to the field or armature, thus dealing with a direct current and avoiding the use of switches or other controlling devices or complex wiring. Either the armature or the field may be driven by the auxiliary motor, and the auxiliary motor may be of any suitable form, construction, and arrangement and may be an electric, steam, gas, gasolene, or other type of motor.

In the drawings illustrating various arrangements embodying the principles of the invention reference-sign B designates the auxiliary motor. This auxiliary motor may be an electric motor, as shown in Figs. 1 and 2, or a steam, gas, or other form of motor, as shown at B', Fig. 3. The driven part of the operating-motor, whether it is the armature or the field, may be actuated from the auxiliary motor B B' in any suitable manner. For instance, such driven part may be carried by or driven from a shaft A, the latter being driven or rotated by the auxiliary motor. In the form shown in Figs. 1 and 2 the armature C of the operating-motor is the part that is driven, while in Fig. 3 the field D' is shown as the driven part of the operating-motor. The driven part may be mounted directly on or otherwise suitably connected to and driven from the shaft A, as clearly shown. In the case where the armature is the driven part of the motor the field D may be assembled in coöperative relation thereto, but revoluble independently thereof, as shown in Figs. 1 and 2, and where the field is the driven part the armature C C' may be assembled in coöperative relation thereto, but revoluble independently thereof.

From the foregoing description it will be seen that by employing an operating-motor with an armature and field independently revoluble, one of these parts being driven by an auxiliary motor, the rotation of the other part, its speed, and direction may be controlled by merely varying the strength of current supplied to such armature or field, and hence I can effect a control of the motor or the part thereof employed for transmitting motion or power in a most simple and efficient manner, having to deal with direct current and merely to change the strength thereof. A convenient and exceedingly-simple arrangement is shown, wherein a main switch J is employed, suitably connected to a source of current. This switch when closed closes a circuit (indicated by reference-sign $a$) to an insulated ring K, carried by or suitably connected to the field. Thence such circuit leads through wire $b$ to and through the field-coils D, wire $c$, ring L, wire $d$, and switch J to the return-wire. At the same time another circuit is closed by switch J through wire $f$, ring M, wire $g$, the armature to wire $c$ and return to switch J, through ring L and wire $d$. Thus by introducing a suitable controllable resistance or other current-varying device in either the circuit of the armature or that of the field the desired control of the motor as to direction and speed is effected. Thus when the currents flowing through the armature and field, respectively, of the operating-motor are such as to tend to produce a speed of rotation equal to that at which the driven part is driven by the auxiliary motor, then there is a tendency of the driven part to hold the other part at rest; but when the currents flowing through the armature and field, respectively, are such as to tend to produce a faster speed of rotation than that at which the driven part is driven, then the driven part exerts its power to drive the other part in the opposite direction with respect thereto and at a speed equal to the difference between the speed at which the operating-motor is tending to revolve and that at which the driven part is driven, and if the current flowing through the armature and field, respectively, is such as to tend to produce a slower speed of rotation than that at which the driven part is driven, then the driven part exerts its power to drive the other part in the same direction in which the driven part is rotating and at a speed equal to the difference between the speed at which the driven part is driven and the speed at which the operating-motor is tending to revolve. It is obvious that the means through which the current strength is varied may be introduced into the circuit of either or both of the parts of the motor. Thus the main switch J when once closed requires no further attention.

It is obvious that only one operating-motor may be associated with the auxiliary motor, as shown in Figs. 2 and 3, or said auxiliary motor may drive the driven part of two or any other number of motors, as indicated in Fig. 1.

In case the auxiliary motor is an electric motor, as shown in Fig. 1, the mains or feeder-wires $a'$ $b'$, through which current is supplied to said auxiliary motor, may also be employed for feeding the operating-motors, a switch J being employed in connection with each operating-motor. Thus the operation of any one or all of the operating-motors may be arrested by suitably manipulating the switches J without arresting or interfering with the operation of the auxiliary motor. A master or wall switch N may be employed for controlling the mains or feeders $a'$ $b'$, and of course when the circuit is broken at this switch all the motors are arrested, including the auxiliary motor.

A motor embodying the principles above explained may be used for any purpose for which a motor is required by suitably connecting the machinery-shaft or other thing with the operative element of the motor. In the drawings I have shown my invention as applied to the hoisting-motor of an elevator. In this case the operating element of the motor may be carried by, formed on, or otherwise suitably connected to a drum E E', upon which is wound the hoisting-cable F, said cable after passing over suitable guide-sheaves G being connected to the car H. Of course, if desired, any well-known, suitable, or convenient arrangement of multiplying-gears may be employed, as will be evident to any one skilled in the art. In the particular form shown in Figs. 1 and 2, to which, however, the invention is not to be limited or restricted, the armature C is mounted on shaft A, and the drum E, which carries or is connected to the field D, is loosely sleeved on said shaft, with the armature C in concentric relation with respect thereto, and the cable F is adapted to be wound on or unwound from said drum. As shown in Fig. 3, the hoisting-drum E' is suitably connected to the armature C', the field D' being mounted on or driven from shaft A.

The current-varying device (indicated at O) may comprise suitably-arranged resistance-coils and may be arranged in the circuit $a$ through the motor-field. A simple and convenient arrangement is shown, wherein the wire $a$ leads from switch J to a contact $f'$ on the car, thence through a contact-bar $g'$ and through the resistance-coils O and wire $a$ to ring K. The resistance-coils O may be so relatively arranged with respect to lever $g'$ that when said lever stands in a vertical position, for instance, the current flowing through the field D is of such strength that the speed of rotation at which the operating-motor tends to revolve equals the speed at which the armature is driven, and therefore, as above explained, the field D is stationary and the car is at rest. Now by moving the lever or bar $g'$ to the right the strength of the field-current is reduced by having to traverse more of the resistance-coils, and by moving said lever to the left the strength of the field-current is increased by reason of its having to traverse fewer of the resistance-coils. Thus a most simple control is provided, requiring merely two wires to the car, a resistance-box, and an operating lever or bar.

Instead of driving the driven part of the operating-motor at a constant speed it is obvious that provision may be made for varying the speed of the auxiliary motor or by varying the relative speeds of both motors. Such an arrangement is shown in Fig. 2, wherein the master or wall switch N' is connected by wire $a^2$ to post $a^3$, at which point the current divides, one part passing through wire $a^4$, the armature of the auxiliary motor, wire $a^5$ to post $a^6$, and return-wire $a^7$. The other part passes through wire $a^8$ to ring M', where it divides, one part passing therefrom through wire $a^9$, armature C of the operating-motor, wire $a^{10}$, ring L', to return-wire $a^{11}$. The other part of this divided circuit leads through wire $a^{12}$ to contact device $f^3$ on the car, whence it may be completed through lever or arm $f^4$ to either contact $f^5 f^6$, according to which direction said lever is rocked, said contacts being separated from each other, but electrically connected together, thence through wires $a^{13}$, $a^{14}$, and $a^{11}$ to the return. If desired, a circuit may also be broken by the centering of the control-lever through the coils of a solenoid R, arranged to operate a brake P, carried by a lever S, the arrangement being such that when the solenoid is energized the brake is released and when the solenoid-circuit is broken the brake is applied.

From the foregoing description it will be seen that the armature of auxiliary motor B and the armature C of the operating-motor are in parallel relation with respect to each other and that they may be fed with a constant current.

From contact-strip $f^3$ on the car a circuit is completed through lever $f^4$ to resistance-coils W, from opposite ends of which circuits are completed, as follows: through wire $b^5$, post $b^6$, wire $b^7$, the field-coils of the auxiliary motor B, wire $b^8$, post $a^6$, and return-wire $a^7$. The circuit from the opposite end of resistance-coils W is completed, as follows: through wire $c^5$, ring K', wire $c^6$, the field-coils D of the operating-motor, wire $c^7$, wire $a^{10}$, ring L', wire $a^{11}$, to the return. The separated contacts $f^5 f^6$, lever $f^4$, and resistance-coils W are so relatively arranged that when said lever occupies a central position the current flowing through the field-coils of the auxiliary and operating motors are of such respective strength that they produce an equal speed of rotation in each motor and the circuit through contacts $f^5$ and $f^6$ is broken. Under these conditions the operating part of the operating-motor, or in the particular case shown the drum E, will not be rotated, the brake-circuit will be broken, and consequently the car will be stationary and the brake applied. Now if the lever $f^4$ is thrown to the right from its central position the strength of the current through the field of the auxiliary motor will be decreased and that through the field of the operating-motor will be increased, thus disturbing the electrical equilibrium and causing the drum E to revolve in one direction, say, to lower the car. The same movement of lever $f^4$ completes the brake-circuit through contact $f^6$, and hence releases the brake. If lever $f^4$ is moved to the left from its central or neutral position, the strength of the current passing through the field of the auxiliary motor will be increased and the field D will be decreased, thus also disturbing the electrical equilibrium in the opposite direction and causing the drum E to revolve in the opposite direction to raise the car. This movement of the lever $f^4$ also closes the brake-circuit through contact $f^5$, and hence releases the brake. The extent to which the lever $f^4$ is moved or thrown in either direction determines the extent of variation in current strength, and the desired variation in direction of rotation and speed of the operating part of the operating-motor is effected through the conjoint action of variations in the current strength supplied to the operating-motor and to the auxiliary motor.

In the foregoing specification I have described how variations in speed and direction of rotation of the operating part of the operating-motor may be obtained by varying the speed of the operating-motor, also by varying the speed of both motors. It is obvious that the same results may be obtained by merely varying the speed of the auxiliary motor. It is obvious that the brake feature may also be applied to the arrangement shown in Figs. 1 and 3.

From the foregoing description it will be seen that I provide an exceedingly-simple method of control of motors; that direct currents are employed; that the operating circuits are never broken except when it is desired to completely cut out of operation the entire system or any one or more of the operating-motors, and this cut-out is effected through the main switches J, N, or N', and hence injurious effects of sparking are avoided, and that the only circuit which is broken is the brake-circuit, and this may carry a comparatively weak current.

Having now set forth the object and nature of my invention and various constructions and arrangements embodying the principles thereof, what I claim as new and useful and of my own invention, and desire to secure by Letters Patent, is—

1. The combination with a car, a hoisting-cable therefor, a drum over which said hoisting-cable operates, of a motor having its armature and field mounted to rotate in opposite directions, said drum connected to one of said parts, means for driving one of said parts, and means for maintaining the rotation of the armature and field at different speed ratios, as and for the purpose set forth.

2. The combination with a car and a hoisting-drum therefor, of a motor having its armature and field mounted for rotation in opposite directions, said drum connected to one of said parts, driving mechanism for one of said parts, and a controlling-lever on the car, circuits therefor, whereby the speed ratios of rotation of the armature and field are varied, as and for the purpose set forth.

3. The combination with an electric motor having its armature and field independently revoluble, a drum connected to one of said parts, and means for maintaining the rotation of the armature and field at different speed ratios, as and for the purpose set forth.

4. The combination with a car, a hoisting-drum therefor, of an electric motor having its armature and field independently revoluble, said hoisting-drum connected to one of said parts, and means carried by the car for controlling the variations in relative speed ratios in rotation of the armature and field, as and for the purpose set forth.

5. In an electric elevator, a motor having its armature and field independently revoluble, a car, hoisting connections between said car and one of said independently-revoluble parts, and means controllable from the car for maintaining the rotation of the armature and field at different speed ratios, as and for the purpose set forth.

6. In an electric elevator, a motor having its armature and field independently revoluble, a hoisting-drum connected to one of said independently-revoluble parts, a car, hoisting connections between said car and drum, and means controllable from the car for maintaining the armature and field at different speed ratios, as and for the purpose set forth.

7. The combination with an electric motor having its armature and field independently revoluble, of means for varying the relative speed of said independently-revoluble parts, a drum arranged to be driven by one of said parts, a brake for said motor, and means whereby said brake is applied when the circuit of the motor is broken, as and for the purpose set forth.

8. In an electric elevator, a car, a hoisting-motor therefor, said motor having an independently-revoluble armature and field, hoisting connections between the car and one of said parts, and means for varying the relative speeds of the armature and field to vary the speed of the car, as and for the purpose set forth.

9. In an electric elevator, a car, a hoisting-motor therefor, said motor provided with an independently-revoluble armature and a field, hoisting mechanism between the car and one of said parts, and means from the car for varying the relative speed of the armature and field to vary the speed of the car, as and for the purpose set forth.

10. In an electric elevator, a car, a hoisting-motor therefor, said motor provided with an armature and a field, arranged for independent rotation, hoisting connections between the car and one of said parts, and means controllable from the car for varying the speed of the car, as and for the purpose set forth.

11. In an electric elevator, a hoisting-motor having an independently-revoluble armature and a field, a car, connections between said car and one of said parts, and means controllable from the car for varying the speed and direction of rotation of one of said parts with reference to the other, as and for the purpose set forth.

In witness whereof I have hereunto set my hand, this 21st day of November, 1899, in the presence of the subscribing witnesses.

HAROLD ROWNTREE.

Witnesses:
J. B. BURDETT,
S. E. DARBY.